UNITED STATES PATENT OFFICE.

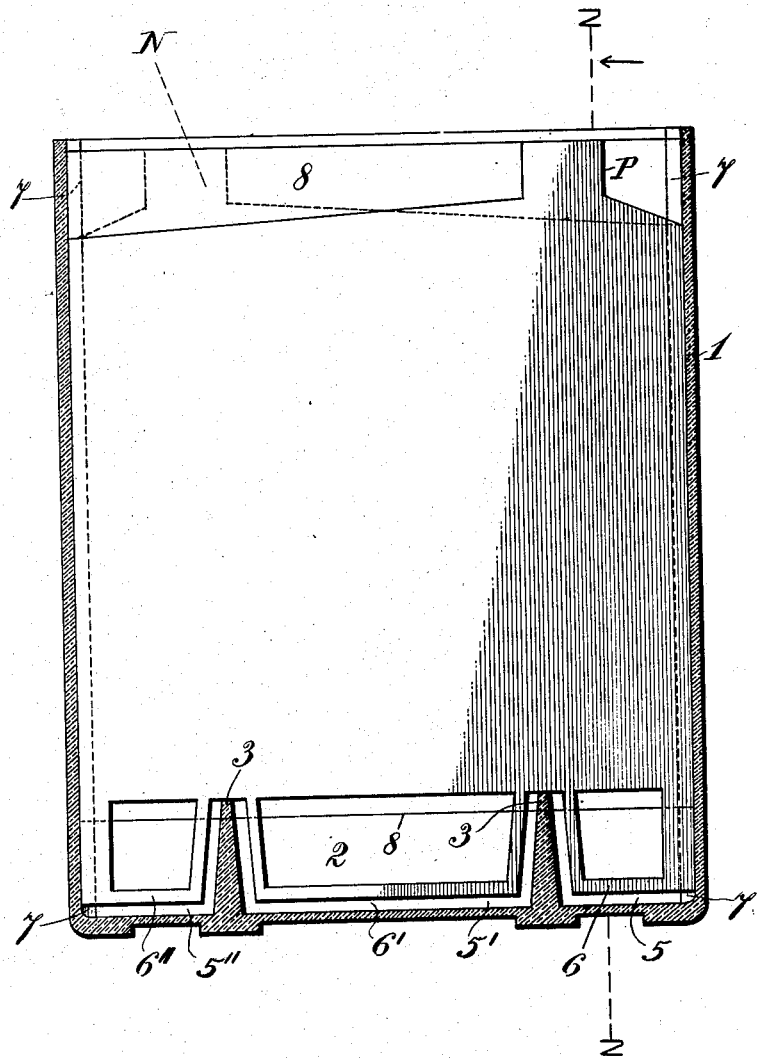

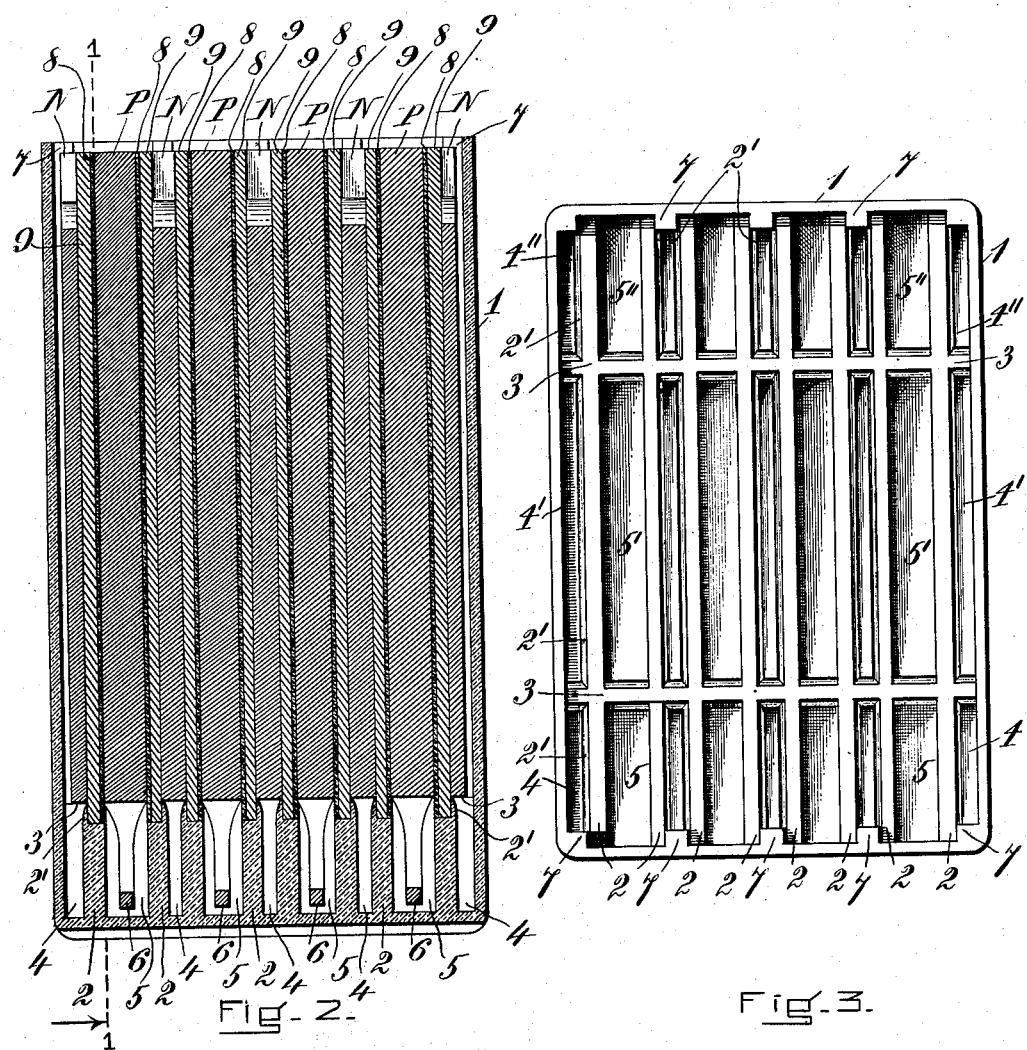

EDWARD C. EKSTRÖMER, OF BOSTON, AND MELCHER EKSTRÖMER, OF QUINCY, MASSACHUSETTS, ASSIGNORS TO JOSEPH C. KENT, TRUSTEE, OF BOSTON, MASSACHUSETTS.

STORAGE BATTERY.

No. 918,832.     Specification of Letters Patent.     Patented April 20, 1909.

Application filed August 1, 1907. Serial No. 386,516.

*To all whom it may concern:*

Be it known that we, EDWARD C. EKSTRÖMER and MELCHER EKSTRÖMER, subjects of the King of England and the King of Sweden, respectively, and residents, respectively, of Boston, in the county of Suffolk, and of Quincy, in the county of Norfolk and State of Massachusetts, have invented a new and useful Improvement in Storage Batteries, of which the following is a specification.

Our invention relates to storage batteries and its object is to improve the construction and efficiency thereof in the manner hereinafter set forth.

In the drawings which accompany and form a part of this specification we have illustrated one form of storage battery embodying the principle of our invention, but it will be understood that we do not limit ourselves to the particular construction shown in said drawings inasmuch as said construction may be subject to a wide range of variation without departing from the spirit of our invention.

In the drawings, Figure 1 is a view showing a longitudinal vertical section of a storage battery constructed in accordance with the present invention, the section being taken on the line 1—1 of Fig. 2 looking in the direction of the arrow. Fig. 2 is a view showing a transverse vertical section taken on the line 2—2 of Fig. 1. Fig. 3 is a plan view of a storage battery shown with the plates and separators removed.

1 represents the battery jar which may be of hard rubber or other suitable acid-proof material and the base of which is provided with two or more transversely extending tapering ribs 3 and a plurality of longitudinally extending ribs 2, said ribs preferably being formed integral with the casing. Each rib 2 is provided with a seat adapted to receive the wooden separators 8 and the rubber plates 9 and as shown at 2' the upper edges of said ribs may be tapered. The ribs 2, 3 form pockets 4, 4' and 4'' above which the negative plates N are placed, said negative plates being supported by the ribs 3. The ribs 2, 3 also form pockets 5, 5' and 5'', above which the positive plates P are placed, said positive plates also being supported by the ribs 3 and carrying depending portions 6, 6' and 6'' which extend into the pockets 5, 5' and 5'' respectively. The said depending portions are formed integral with the positive plates and may be of any suitable shape provided they do not completely fill the pockets 5, 5' 5''. The casing may be provided as shown with vertically extending ribs 7 opposite which the negative plates are placed.

By means of the construction above described, all danger of short-circuiting the battery by deposits of active material in the bottom of the casing is prevented, inasmuch as the tapered portions 2' of the ribs 2 extend up to the lower edges of the negative plates. During the operation of storage batteries the positive plates disintegrate and the active material thereof accumulates at the bottom of the battery thereby reducing the output and efficiency thereof. By means of the present invention, all active material from the positive plates is retained in the pockets 5, 5', 5'' and becomes compacted into a solid mass around the depending members 6, 6', 6'' which extend into said pockets. In this way the disintegration of the positive plates does not seriously affect the output of the battery because that portion of said active material which accumulates around the depending members 6, 6', 6'' is available for assisting that portion thereof which is retained on the grids in producing current.

We claim:

1. A storage battery having its base provided with transversely and longitudinally extending ribs forming two series of separated pockets constructed and arranged to receive active material from the plates, and plates and separators so supported by said ribs as to render said series of pockets non-communicating.

2. A storage battery vessel having its base provided with a plurality of transversely extending ribs adapted to support the positive and negative plates and a plurality of longitudinally extending ribs adapted to support the separators of said plates, said ribs forming two series of pockets constructed and arranged to receive the active material which drops from the positive and negative plates respectively.

3. A storage battery having its base provided with transversely and longitudinally extending ribs forming a series of separated and non-communicating pockets, means supporting the positive plates above said pockets, and members integral with and depending from said plates and extending into but not filling said pockets whereby the active material falling from the positive plates may be retained in said pockets and compacted into a solid mass around said members.

4. A storage battery vessel having its base provided with a plurality of longitudinally extending ribs, said ribs being provided with seats for the separators of the positive and negative plates and having their upper edges tapered.

5. A storage battery having its base provided with two series of separated pockets, one series of pockets being constructed and arranged to receive active material from the positive plates, and the other, the active material from the negative plates, of said storage battery, and plates and separators so supported by said ribs as to render said series of pockets non-communicating.

6. A storage battery having its base provided with transversely extending ribs and a plurality of pairs of longitudinally extending ribs, said longitudinally extending ribs being provided with seats, positive plates supported by said transversely extending ribs, separators of insulating material supported by said seats and negative plates also supported by said transversely extending ribs and arranged over the pockets formed by the members of each pair of longitudinally extending ribs, each positive plate being provided with depending members extending into the pockets formed by each pair of longitudinally extending ribs.

In testimony whereof, we have hereunto subscribed our names this 29th day of July 1907.

EDWARD C. EKSTRÖMER.
MELCHER EKSTRÖMER.

Witnesses:
E. B. TOMLINSON,
GEO. K. WOODWORTH.